United States Patent
Murali et al.

(10) Patent No.: US 11,842,373 B2
(45) Date of Patent: Dec. 12, 2023

(54) SYSTEM AND METHOD FOR TRACKING LIGHT ELECTRIC VEHICLE RENTALS

(71) Applicant: NEUTRON HOLDINGS, INC., San Francisco, CA (US)

(72) Inventors: Vijay Murali, San Francisco, CA (US); Omar Guenena, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 0 days.

(21) Appl. No.: 17/367,011

(22) Filed: Jul. 2, 2021

(65) Prior Publication Data

US 2023/0005028 A1 Jan. 5, 2023

(51) Int. Cl.
*G06Q 30/0283* (2023.01)
*G06Q 10/02* (2012.01)
*G06Q 50/30* (2012.01)
*H04W 4/02* (2018.01)

(52) U.S. Cl.
CPC ......... *G06Q 30/0284* (2013.01); *G06Q 10/02* (2013.01); *G06Q 50/30* (2013.01); *H04W 4/023* (2013.01)

(58) Field of Classification Search
CPC .... G06Q 30/0284; G06Q 10/02; G06Q 50/30; H04W 4/023
USPC .......................................................... 705/418
See application file for complete search history.

(56) References Cited

U.S. PATENT DOCUMENTS

| | | | |
|---|---|---|---|
| 2020/0180719 A1* | 6/2020 | Chadwick | B62J 50/22 |
| 2020/0265488 A1* | 8/2020 | Dhingra | G08G 1/202 |
| 2021/0035032 A1* | 2/2021 | Foley | G06Q 10/02 |
| 2021/0125499 A1* | 4/2021 | Cooper | G06Q 30/0645 |

OTHER PUBLICATIONS

"Top-k Vehicle Matching in Social Ridesharing: A Price-Aware Approach" Published by IEEE (Year: 2021).*
Extended European Search Report of European Patent Office in Appl'n No. 22181562.4, dated Nov. 28, 2022.

* cited by examiner

*Primary Examiner* — Zeina Elchanti
(74) *Attorney, Agent, or Firm* — Dentons US LLP

(57) ABSTRACT

The present application describes systems and methods for tracking rides, using various signal inputs to determine automatically when a ride is terminated, and billing the rider an accurate amount for a vehicle was in use. Users may sometimes forget to terminate their rides via, for example, a smartphone application that allows a user to terminate a ride. Terminating the ride allows the user to stop the timer used to determine the ride price. Terminating a ride early and accurately if a user forgets to themselves also allows the vehicle to be put into a pool of available vehicles more quickly, resulting in more availability for additional users. Ride share vehicles are becoming more and more prevalent in.

20 Claims, 6 Drawing Sheets

SYSTEM AND METHOD FOR TRACKING LIGHT ELECTRIC VEHICLE RENTALS

BACKGROUND

Ride share light electric vehicles (e.g., scooters, bicycles, mopeds, etc.) are becoming more common modes of transportation for short trips in urban environments. Renters of the light electric vehicles are very diverse and interact with the ride share vehicles in a number of different ways. Users sometimes forget to complete a ride and may be billed for time due to human error. This creates a poor user experience.

SUMMARY

It is important to both the users and ride share companies to accurately track rentals of ride share vehicles. Charging renters for time when a vehicle is not in use may upset the renter and lead to less repeat business or complaints. Alternatively, failing to charge a renter for time during which a vehicle was in use or being reserved results in lost profits. The problem is compounded in computer-automated systems in which hundreds, thousands, or tens-of-thousands of rides may occur in one day in one city or across the world.

Methods of ride termination include requiring a user to complete a ride or setting a timer for a maximum ride time, such as 1.5 hours, so that if a rider forgets to terminate a ride via, for example, a smartphone app, the ride will automatically terminate after 2 hours. A rider may also be unable to complete a ride because the light vehicle is in an no-parking zone, their phone dies, they lose an Internet connection, etc. This means that the system will bill the rider for a full 1.5 hours of ride time when they actually only used the light vehicle for a fraction of that period. Billing for a full 1.5-hour period also results in increase of failed credit card charges because they are larger than they should have been, or a user may cancel the charge due to the mistake or a refund due to a dissatisfied rider. The light vehicle is also unavailable for others to use during the period that the rider forgot to complete their ride.

The systems and methods disclosed herein ensure fair treatment of renters by providing accurate bills. This in turn will result in higher customer satisfaction, increased ridership, reduce uncollected revenue, refunds, chargebacks, and customer service inquiries. Additional benefits include more accurate and speedy ride termination by, for example, detecting vehicle speed, current location, and the time. Earlier ride termination also means that the light electric vehicles are available more quickly for other users to rent. Embodiments may be used on various types of vehicles, such as bikes, scooters, and mopeds.

In a first example, the system can automatically detect a ride has ended, without any manual rider input, using various hardware and software inputs from computing devices in the light vehicle, user devices, nearby light vehicles, ride time, Bluetooth connection status, and other inputs. The system may use these inputs to determine whether the light vehicle is for example, idle for a period of time, not actively in motion, or separated from a user device of a rider. User devices may contain an app that periodically sends an app activity heartbeat to a server. Light vehicles may similarly transmit periodic vehicle activity heartbeats to the server. The system may use various combinations of these inputs, including heuristics, to predict or determine accurately and automatically if a ride has ended. This may allow a rider to end a ride by leaving the light vehicle and walking away without providing any manual signals that they are done riding.

In one example, the system can detect that a maximum 1.5 hour ride time was reached, and assume this was a mistake, as a ride longer than 1.5 hours is very rare. As such, the system may only bill the user for the period of time from the beginning of a ride to the time the vehicle became idle. If a rider is still actually using the light vehicle, the system will terminate the ride automatically and in a safe manner (to avoid sudden stops in traffic). Doing this will allow light vehicles to go into a lower-power standby mode sooner, thereby reducing battery usage and ensuring we can recover the vehicle before it goes offline.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Light electric vehicles (e.g., scooters, bicycles, etc.) may be coupled to a system comprising a network of backend and user computing devices. Each of these devices may be coupled to one another via various networks connected to the Internet.

The present disclosure describes systems and methods for terminating rides in vehicles, such as light electric vehicles or automobiles.

In an example, a server may receive an input indicating that a rider is reserving a vehicle. The server may then start a ride clock. The server also receives a plurality of inputs corresponding to the vehicle, wherein the plurality of inputs include vehicle speed and vehicle location. The server can determine whether the plurality of inputs match a plurality of criteria, wherein the plurality of criteria include whether an input, received from the vehicle, indicates that the vehicle has moved within a predetermined period, wherein the plurality of criteria further comprises determining whether the vehicle has moved more than a predetermined distance within the predetermined period. The server can terminate the ride clock if the plurality of inputs match the plurality of criteria. The server can calculate a ride cost, wherein the ride cost comprises a duration of use of the vehicle, minus the predetermined period. The server can transmit the ride cost to an application running on a user device. An application on the user device can display the ride cost.

Although aspects of the disclosure describe the light electric vehicle, other types of vehicles can benefit from this system and method for ride termination. For example, mopeds, skateboards, cars, skates, and other vehicles may benefit from aspects of this disclosure.

Figure 1A:
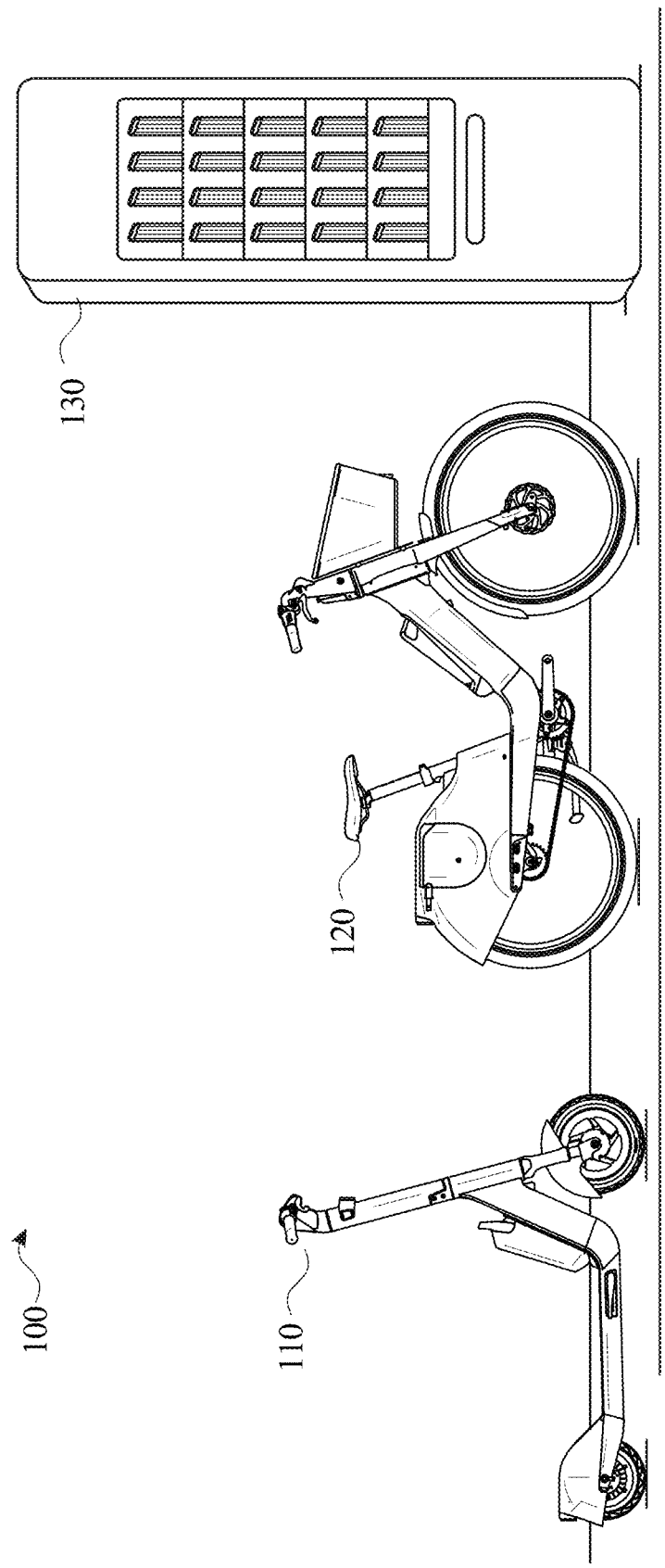
FIG. 1A illustrates different kinds of light electric vehicles according to one or more examples.

FIG. 1A illustrates an example environment 100 in which aspects of the present disclosure may be practiced. As illustrated, environment 100 includes at least one electric scooter 110, at least one electric bicycle 120, and a rechargeable battery kiosk 130. The electric scooter 110 and the electric bicycle 120 are examples of light electric vehicles. Aspects described herein apply to other types of light electric vehicles or larger vehicles.

The environment 100 may include a network service that receives information from the electric scooter 110 or the electric bicycle 120 (also referred to herein as light electric vehicles) over a network communication channel (e.g., one or more networks, the Internet, etc.). The information enables a user, using a client application executing on a computing device (e.g., a mobile application running on a mobile device), to locate, request, and/or reserve (e.g., rent or borrow for a duration of time) one or more light electric vehicles. The information may also enable a user to locate, request, and/or reserve a rechargeable battery for the light electric vehicles. In some examples, the rechargeable battery may be used across different light electric vehicles. For example, the same rechargeable battery may be used by the electric scooter 110 and the electric bicycle 120.

In some examples, the network service includes one or more computing systems or servers that are remote from the computing device of the user and the light electric vehicles. The one or more computing systems include an application programming interface (API) that enables the one or more computing systems to receive information from, send information to, and otherwise interact with the computing device, the light electric vehicles 110, 120 or the rechargeable battery kiosk 130. For example, a mobile device application may have interfaces to access information on a mobile device, such as using APIs to location from a location interface (e.g., GPS), accelerometer, data, to send and receive data via a network communication interface, or use other aspects of the mobile device.

For example, the client application executing on the computing device of the user receives, from the network service over the network communication channel, information about a location of one or more of the light electric vehicles. The location of each of the light electric vehicles can then be provided on a user interface of the client application. Additionally or alternatively, the location information about a location of one or more of the light electric vehicles may be communicated between a plurality of light electric vehicles and/or a plurality of client applications executing on one or more computing devices.

In one example, the user interface of the client application includes a map that displays a determined location of the user and/or a determined location of the light electric vehicles. In some examples, the determined location of the user and/or the determined location of the light electric vehicles is based, at least in part, on Global Positioning System (GPS) data (or other location information) received by the network service over the network communication channel.

The user interface of the client application may display the location information of the user and the light electric vehicles as different icons (or other such representations). Once the location information is displayed, the user may select an icon representing a type of light electric vehicle (e.g., an icon for an electric scooter 110 or an icon for an electric bicycle 120). The user interface of the client application then generates or determines a route (e.g., provides directions) from the user's current location to the selected light electric vehicle. Selection of one of the icons may also enable the user to reserve (e.g., place a hold on) the light electric vehicle (to ensure that the light electric vehicle will be at the determined location when the user arrives), rent the light electric vehicle and/or borrow the light electric vehicle for a period of time.

Each light electric vehicle and/or the network service also includes a location tracking system that tracks, receives, and/or determines a location of each light electric vehicle as it is used. In some examples, the location tracking system tracks the location information of the light electric vehicle in real-time or substantially real-time. In other examples, the location tracking system determines the location information of the light electric vehicle at periodic intervals (e.g., every minute, every five minutes, every ten minutes, etc.). These periodic intervals can be called heartbeats. In yet other examples, the location tracking system may track the location of the light electric vehicle in real-time or substantially real-time when the light electric vehicle is rented or otherwise used by a user and may track location information at periodic intervals when the light electric vehicle has been reserved or is otherwise not is use. The location information may be communicated directly between the light electric vehicle and the network service and/or may be communicated among any variety of peer-to-peer interactions. For example, the location information of a first electric vehicle may be sent to a second electric vehicle, which may send the location information for the first electric vehicle and/or location information for the second electric vehicle to the network service. Additionally or alternatively, location information may be sent to the network service via client application running on a computing device. For example, the light electric vehicle may send location information to the client device and the client device may then send the location information to the network service.

The one or more computing systems of the network service may also include a matching system. The matching system receives, manages or otherwise handles various requests from the user. The requests may include light electric vehicle rental requests and light electric vehicle reservation requests. For example, when a vehicle rental request is received from the client application executing on the user's computing device, the matching system may communicate with the location tracking system and determine which light electric vehicle should be matched with or otherwise assigned to the requesting user. Additionally or alternatively, the matching system may be used by the vehicle provider to collect or locate one or more light electric vehicles.

The one or more computing systems of the network service may also include one or more databases that store information about each of the light electric vehicles, their locations, the number of rides, and the revenue generated by each light electric vehicle. The one or more computing systems of the network service may also include a payment system that processes payment information of the rider. For example, when a rider rents and uses a light electric vehicle, the rider may be charged for the usage based on a duration of use and/or a travel distance. Once the rider has finished using the light electric vehicle (e.g., by arriving at their intended destination, a check-in point, a battery kiosk 130, etc.), the payment system may automatically terminate the ride and process the payment information of the rider.

As discussed above, the environment 100 includes one or more light electric vehicles including, but not limited to, an electric scooter 110 and an electric bicycle 120. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster.

Likewise, and in some examples, the electric bicycle 120 includes vehicle components (e.g., wheels, axles, chains, gears, bicycle seat, handlebar, bicycle frame, braking mechanisms, etc.), one or more electric motors, control systems, sensors, speakers, and/or lights, which may also be powered by a rechargeable battery. The sensors can include a location component (e.g., GPS), speedometer, accelerometer, or pressure sensors for grips or seat.

Figure 1B:
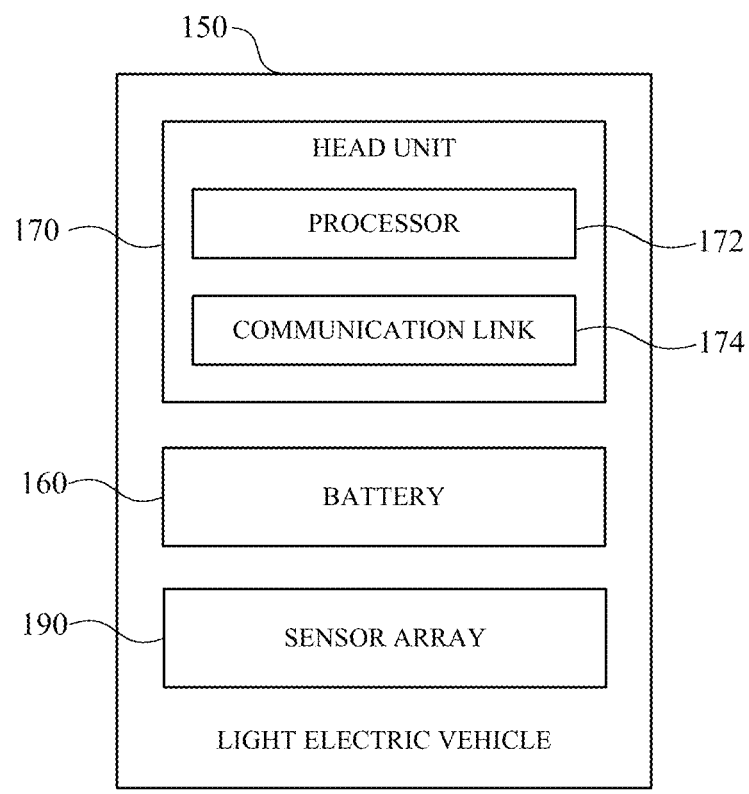
FIG. 1B illustrates a schematic of components coupled to a light electric vehicle.

FIG. 1B illustrates a schematic of components of a electric scooter 110. In various aspects, electric scooter 110 may include a battery, a drive train, and a head unit. The battery may be used to power both the drive train and the head unit of the electric scooter 110. The head unit may include a processor and a communication link. As described herein, the processor may help to determine whether a ride is terminated. For example, the processor may transmit and receive various signals from user devices, other light electric vehicles, or the server. The signals can be associated with reserving and terminating rides, as discussed in detail throughout this specification.

As described herein, the communication link may be capable of communicating via a variety of communication channels, such as 3G, 4G, 5G, LTE, Bluetooth, Wi-Fi, etc. The processor and/or the communication link may select and/or restrict or limit the use of one or more communication channels. As an example, communication channels may be used based on detecting that a computing device is available to receive communications sent over the associated communication channel.

Figure 2:
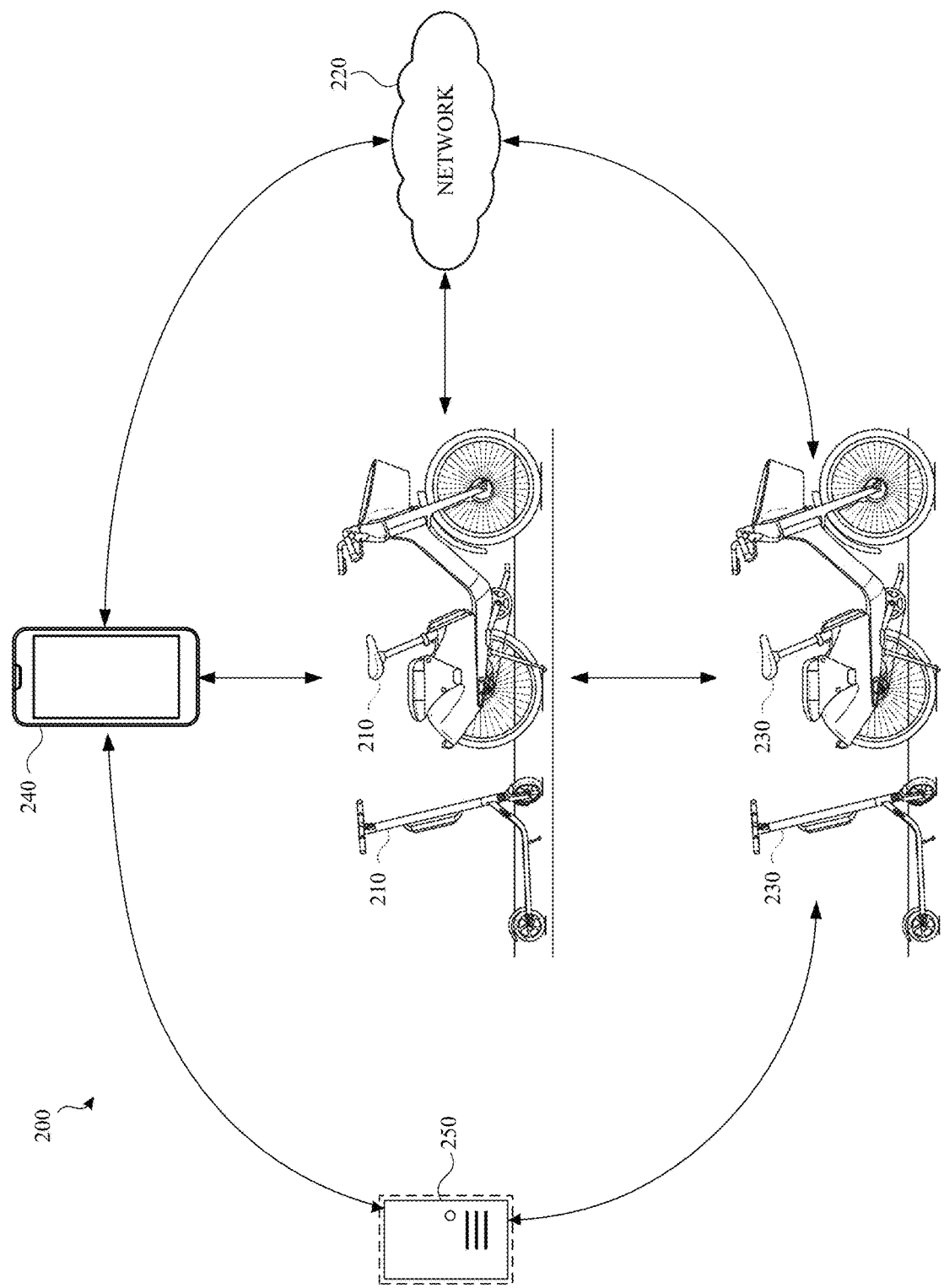
FIG. 2 illustrates a system for ride termination coupled to a light electric vehicle.

FIG. 2 illustrates a system 200 for ride termination for a light electric vehicle 210. In addition to the light electric vehicle 210, the system 200 may include a network 220, a light electric vehicle 230 (which may be proximate to the light electric vehicle 210), a computing device 240, and a server 250. The light electric vehicle 210 and the light electric vehicle 230 may have components and functions similar to those discussed for light electric vehicles 110, 120 and battery kiosk 130 described in FIGS. 1A and 1B. The light electric vehicle 210 may wirelessly communicate with the network 220, the light electric vehicle 230 and/or the computing device 240 over a communication channel (as described herein) using a communication link (e.g., communication link 174). As described herein, information about the light electric vehicle 210 may be required or desired by the network 220 (otherwise referred to herein as a network service) and/or by the computing device 240 (as may be associated with a potential rider of the light electric vehicle 210).

As shown, there may be a variety of network communication paths for the light electric vehicle 210 to send information to the network 220. For example, information may be sent from the light electric vehicle 210 directly to the network 220 over a communication channel. In other aspects, the light electric vehicle 210 may indirectly communicate or send information to the network 220. For example, indirect communication may include information being sent from the light electric vehicle 210 to a computing device 240 via a communication channel, which may be relayed from the computing device 240 to the network 220 at a time when a communication channel between the computing device 240 and the network 220 is available. As another indirect communication example, the light electric vehicle 210 may send information to a proximate light electric vehicle 230. The light electric vehicle 230 may then relay the information to a computing device 240 and/or the network 220 at a time when a communication channel between the light electric vehicle 230 and either the computing device 240 and/or the network 220 is available. If the light electric vehicle 230 relays the information to a computing device 240, the information may be relayed from the computing device 240 to the network 220, at a time when a communication channel between the computing device 240 and the network 220 is available. In any of these methods, communication to the network 220 may be directed to any of the devices or the server via the network 220.

Additionally, there may be a variety of client communication paths for the light electric vehicle 210 to send information to the computing device 240. For example, information may be sent from the light electric vehicle 210 directly to the computing device 240 over a communication channel. In other aspects, the light electric vehicle 210 may indirectly communicate or send information to the computing device 240. For example, indirect communication may include information being sent from the light electric vehicle 210 to a network 220 via a communication channel, which may be relayed from the network 220 to the computing device 240 at a time when a communication channel between the computing device 240 and the network 220 is available. As another indirect communication example, the light electric vehicle 210 may send information to a light electric vehicle 230. The light electric vehicle 230 may then either relay the information to a computing device 240 and/or the network 220 at a time when a communication channel between the light electric vehicle 230 and either the computing device 240 and/or the network 220 is available. If the light electric vehicle 230 relays the information to a network 220, the information may be relayed from the network 220 to the computing device 240, at a time when a communication channel between the computing device 240 and the network 220 is available.

Although FIG. 2 shows a light electric vehicle 210 and a light electric vehicle 230, it should be appreciated that information may be relayed across a plurality of other light electric vehicles in a peer-to-peer network. In an example, the information may be shared across multiple light electric vehicles until the information is received at a desired location or device (e.g., received by the network 220 and/or a computing device 240). For example, information about a first vehicle may be sent to a second vehicle, which is then sent to a third vehicle, etc., until a vehicle that has received the information is capable of communicating the information to a computing device 240 and/or the network 220. In another example where the light electric vehicle 210 sends information to a light electric vehicle 230, the light electric vehicle 230 may send the information associated with the light electric vehicle 210 in addition to information associated with the light electric vehicle 230 and/or other information received from other light electric vehicles (such that information about more than one light electric vehicle is communicated). Sharing of information about multiple light electric vehicles may shared across the peer-to-peer network.

Figure 3:
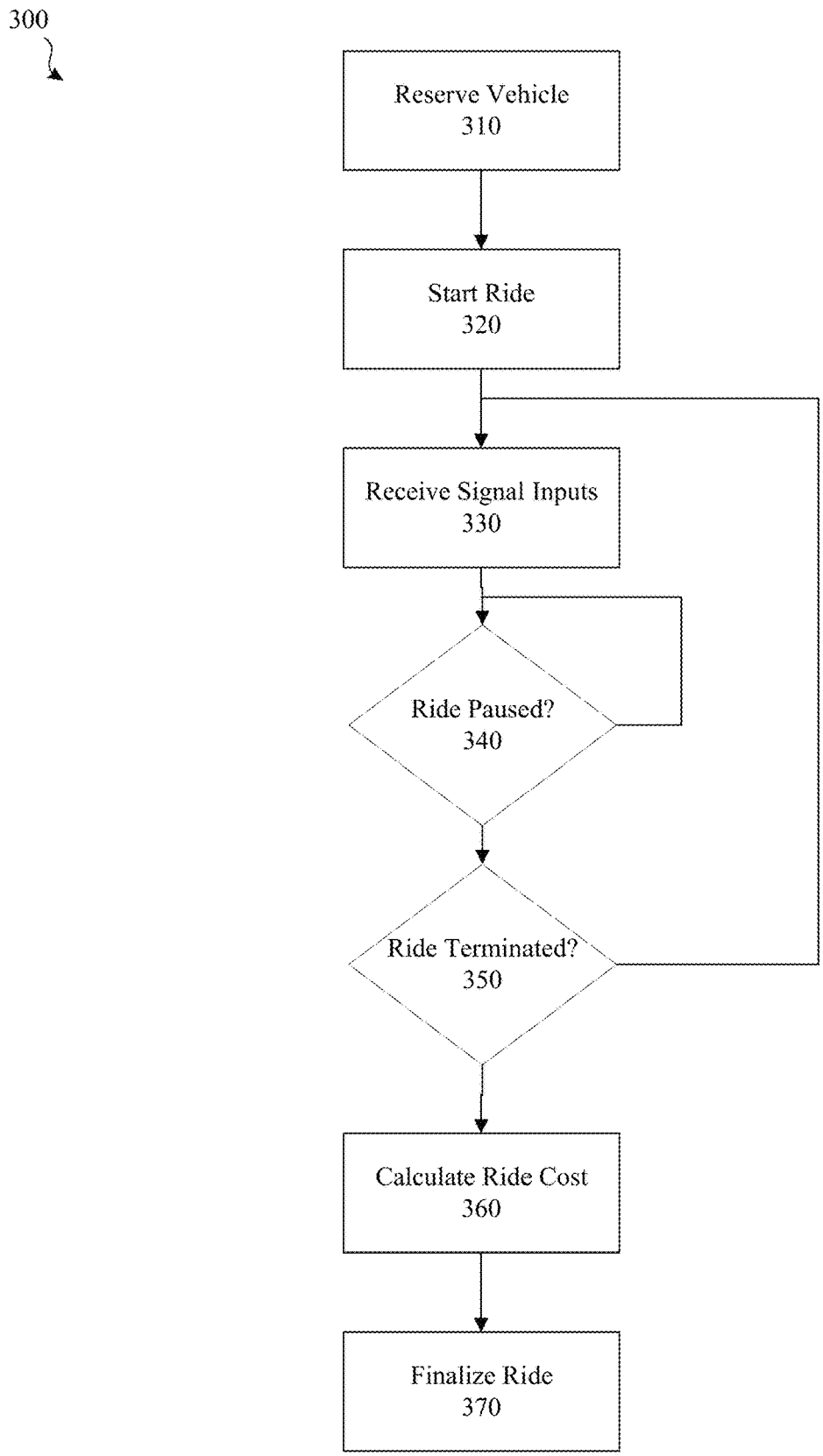
FIG. 3 illustrates an example computer-implemented method of tracking a vehicle reservation and termination through payment.

FIG. 3 illustrates an example flow 300 for an auto-termination process. In this example, a user can reserve a vehicle using a mobile device (step 310). The mobile device can include a mobile application corresponding to a ride share service for personal rides, such as scooters, automobiles, or bikes. The user can initiate a ride or reservation by, for example, clicking a button on a mobile application. The mobile application may then send a message to a server 250 indicating the beginning of a ride (step 320). The server 250 may then begin a ride clock starting at 00:00:00. In step 330, the server may receive signal inputs from a plurality of devices, including the vehicle being ridden, a user device associated with the rider, or other vehicles nearby to the vehicle being ridden, as discussed above in the context of FIG. 2. The signal inputs can include vehicle speed, which may be obtained from a speedometer on the vehicle, or GPS signals from the vehicle or the user device. Additional signal inputs can include vehicle location, which can also be obtained via GPS or other similar location service. Still more inputs can include detection of movement from, for example, one or more accelerometers on the user device or the vehicle, inputs from a throttle or brake on the vehicle, pressure sensors on the grips, seat, or other surface the user is contacting on the vehicle. More inputs may include a magnetometer to indicate direction, a hall effect sensor to detect whether a lock is engaged, a gyroscope to sense the orientation of the vehicle, or a proximity sensor for sensing whether a vehicle is in use.

The illustrated embodiment includes a loop 340 for allowing a user to pause a ride by, for example, pressing a pause button on a mobile device application, which causes the server to receive a pause indication. This allows a user to continue a reservation while a user makes a brief stop, for example to get coffee or see a friend. This embodiment can allow for the vehicle to enter a lower power state to reduce the number of heartbeats sent to the server 250, or to stop the heartbeats entirely. Alternative embodiments may continue to send signals to the server 250. The server 250 may charge the user a reduced rate during the paused period, or the server 250 may charge the same rate. In either case, the server 250 will not terminate the ride during the pause period, unless, for example, the pause period exceeds a predetermined period of time, e.g., 30 minutes. The user may be able to select the length of a pause period in some embodiments, e.g., in increments of 10 minutes up to 1 hour. The server 250 will remain in the pause period during this period of time.

Step 350 illustrates the server 250 determining whether signal inputs received from one or more of the vehicle or mobile application match predetermined criteria. Embodiments can use various criteria. One criteria can be the identity of the rider, for example, is the rider a customer or an employee. The ride termination algorithm may differ depending on whether the rider is a customer or an employee testing a vehicle. The algorithm may also differ depending on whether the rider is solo or part of a group ride, e.g., one rider unlocks multiple vehicles for a group of riders. Further criteria can include whether the last heartbeat speed was 0 mph. If the vehicle remains idle for a predetermined period of time, e.g., 5 minutes, the server 250 can provide an transmit a command to the mobile application to display a warning that the ride will terminate within 5 minutes. Then the ride may terminate if the vehicle remains idle for an additional 5 minutes. Embodiments may also require that the vehicle has not moved a predetermined distance, e.g., 500 m, within this time. The server 250 may then terminate the ride after the vehicle meets the criteria, which in this example is 10 minutes. The system may or may not bill the user for this idle period.

Additional embodiments may send a user one or more warning messages that a ride will terminate during a paused state. For example, the server 250 may cause one or more warnings at intervals until a maximum time limit is reached, at which point the server 250 can terminate the ride. Alternatively, a mobile application on the user's mobile device may allow the user to extend the pause period. The server 250 can then choose to charge or not charge the rider for the paused period.

Another criteria for terminating a ride can be whether the server 250 has received any heartbeat signals from a vehicle for a predetermined period, e.g., 15 minutes. This can happen when, for example, the vehicle loses power, suffers a technical failure, or loses network connection. The server 250 may then terminate the ride if it has not received a heartbeat signal for the predetermined period. The server 250 may or may not bill the user for that predetermined period. The server 250 may also send a warning message to the user if it has not received a heartbeat signal before the end of the predetermined period. The server 250 may be able to log the location of the user device via the mobile application even if it is out of contact with the vehicle. The server 250 may store this information to help find the vehicle that it lost communication with.

Another useful criteria is the distance between the rider's mobile device and the vehicle. If the vehicle is idle and the user's mobile device location is farther than a predetermined threshold distance from the vehicle, the system can assume the user's ride is complete. Any of these criteria may be used alone or in combination with any of the other criteria as required for any specific applications. Scooter, bikes, mopeds, and automobiles may have different us cases and treated differently. It is therefore beneficial to allow for adjustments to the criteria to suit different situations.

The system may also consider the battery level of a user's mobile device. For example, if a user's mobile device has very little power, e.g., 5% life remaining, the mobile device may lose power before the end of the ride, leaving the user unable to manually terminate a ride. The system may allow the user to continue riding for a predetermined period, e.g., 5 minutes, before terminating the ride and locking the vehicle.

The system may also end a ride if a vehicle is detected in a no-parking zone. Users may not know that they are leaving the vehicle in a no-parking zone, and therefore fail to terminate a ride properly. In this case, the system may automatically terminate the ride if the vehicle remains idle in a no-parking zone for a predetermined period.

Another embodiment can set an upper bound for the length of a trip, e.g., 1.5 hours, after which the ride will automatically terminate.

The system may terminate of a ride in various ways. For example, the server 250 may instruct the vehicle to stop at a safe location. The server 250 could also slowly reduce the throttle of the vehicle until it stops. The server 250 could also instruct the vehicle to slowly apply the brakes until the vehicle is stopped. Different types of vehicles may have different termination protocols. Large vehicles, for example, need to be more concerned with collisions than lighter vehicles, such as scooters. Large vehicles, therefore, may have a slower termination process to avoid any quick changes that could result in a collision. A scooter, on the other hand, is less likely to need to maintain speed in heavy traffic, and could therefore have a faster termination process.

The server 250 may then calculate the ride cost and perform additional termination processes in step 360. These processes can include determining the billing period, such as whether to include paused portions of the ride or idle periods at the end of a ride but before termination. The server may also change the state of the vehicle in a database from in use to available, and similarly change the state of a ride from in-progress to terminated. The server 250 may then generate a message include the cost and trip summary, e.g., path traveled, to the mobile application on the user device. The cost of the trip may be determined based on the total ride time and can include fixed costs, such as an unlock fee. The final cost may be a percentage of this total amount based on the total ride time divided by the total reserved time. As such, the percentage may affect not only the cost associated with the ride time but also the fixed costs. This cost can also incorporate any discounts or promotions that the user is eligible for. The trip summary is similar to a receipt. Finally, the server may lock the vehicle until another user rents it or it needs service.

Figure 4:
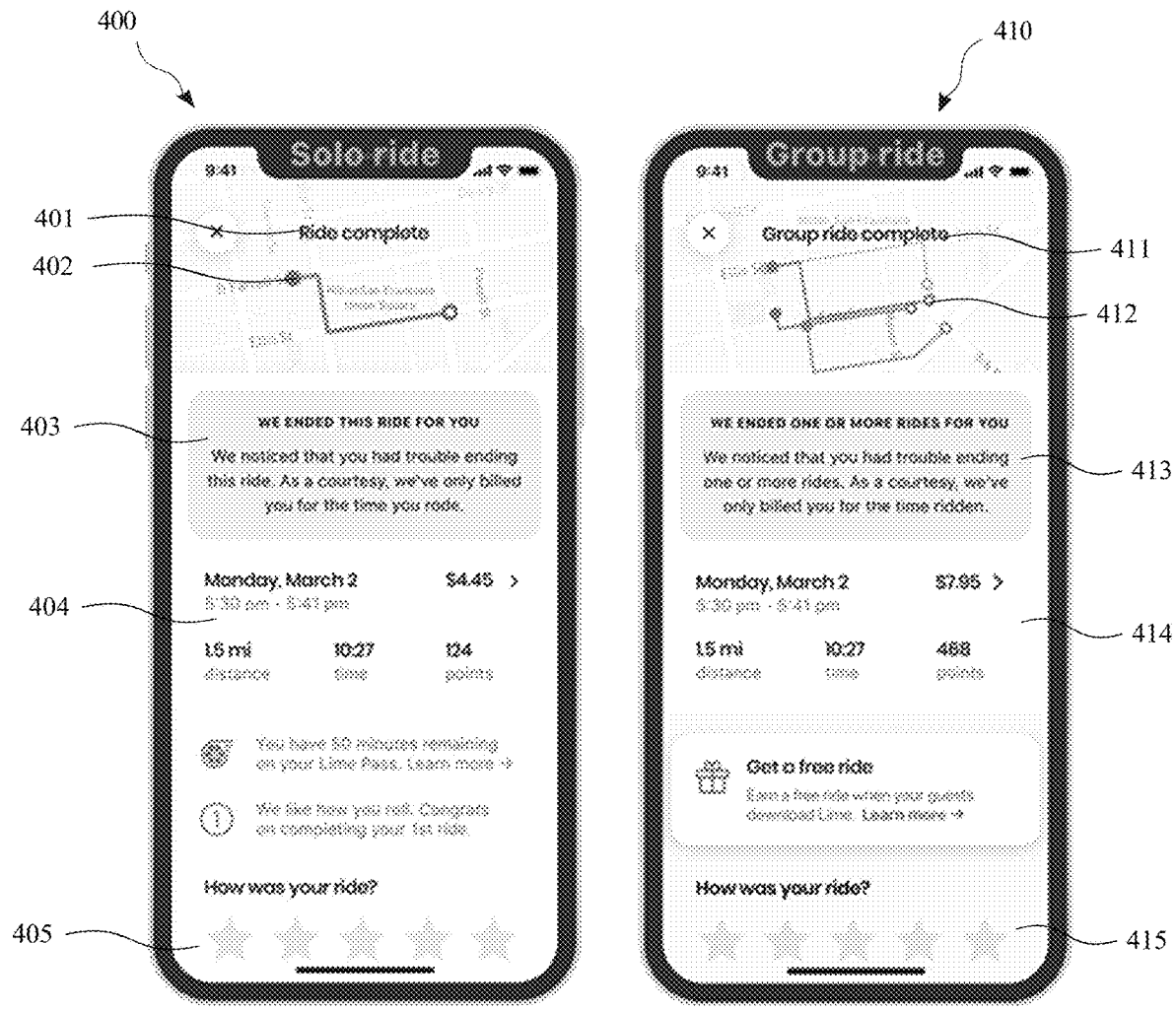
FIG. 4 illustrates examples of ride summaries.

FIG. 4 illustrates example embodiments of a solo trip summary 400 and a group trip summary 410. The trip summaries 400 and 410 include ride completion indications 401 and 411, which further include the path(s) taken 402 and 412. The trip summaries 400 and 410 further include ride end notifications 403 and 413 indicating that the system automatically terminated the rides for the user and only billed them for the time the vehicle was ridden. FIG. 4 includes further details of the ride 404 and 414, indicating the date and time of the ride, the price, the distance, the ride time, and points accumulated for the ride. Finally, the trip summaries 400 and 410 include a rating system, which in this example includes a 5-star rating systems 405 and 415.

Figure 5:
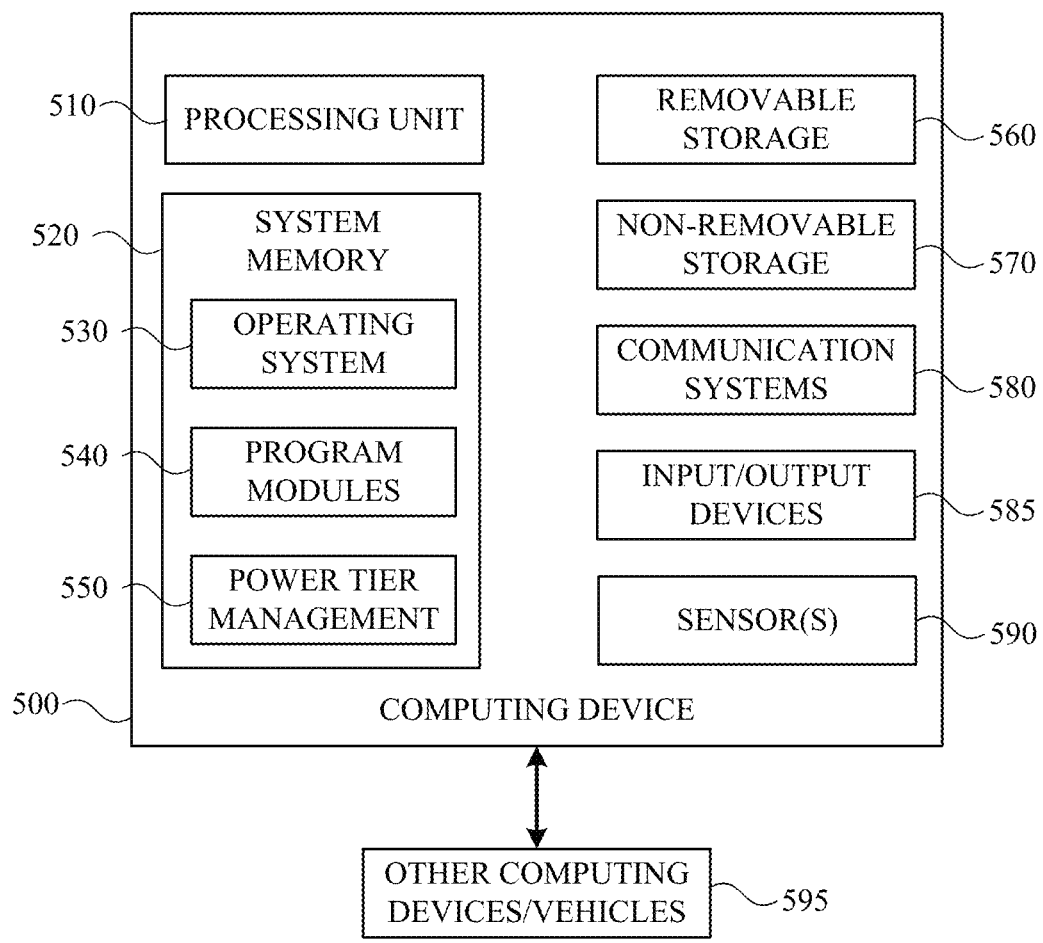
FIG. 5 illustrates a system diagram of a computing device that may be integrated or otherwise associated with power tier management of a rechargeable battery of a light electric vehicle.

FIG. 5 illustrates a system diagram of a computing device that may be integrated or otherwise associated with power tier management of a rechargeable battery of a light electric vehicle. The computing device 500 may be integrated with or associated with a light electric vehicle and/or the head unit of a light electric vehicle and/or a power tier management system described herein. As shown in FIG. 5, the physical components (e.g., hardware) of the computing are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for gathering or determining expected force readings, light electric vehicle information, and the like. The system memory 520 may also store and/or provide power tier management 550 that cause or determine power tier management of the battery of the light electric vehicle, as described herein. A number of different program modules and data files may be stored in the system memory 520, including operating state information. While executing on the processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 500 may include one or more communication systems 580 that enable the electric vehicle to communicate with rechargeable batteries, other computing devices 595, a network service and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 585. These input/output devices 585 may include a keyboard, buttons, switches, a sound or voice input device, haptic devices, a touch, force and/or swipe input device, a display, speakers, etc. The aforementioned devices are examples and others may be used.

The computing device 500 may also include one or more sensors 590. The sensors may be used to detect or otherwise provide information about the operating condition of the computing device 500. In other examples, the sensors 590 may provide information about a light electric vehicle and/or whether the light electric vehicle brake inspection device is operating correctly and/or is being used correctly via Diagnostics Trouble Code DTCs (e.g., sensors sending signals to the CAN-bus indicating whether the handlebar and brake lever are correctly/completely inserted into the light electric vehicle brake inspection device). As discussed previously, the sensors can include GPS, speedometer, accelerometer, or pressure sensors for grips or seat.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A method, comprising:
receiving, at a server via a wireless network signal, an input indicating that a rider is reserving a vehicle via an application running on a user device, the reserved vehicle including a location tracking system that is configured to be uniquely matched to the rider during the reservation;
in response to receiving the vehicle reservation, starting, by the server, a ride clock that is remote from the vehicle;
receiving, at the server, one or more inputs from sensors on the reserved vehicle or the user device, wherein the application comprises a location interface,
wherein the one or more of inputs include vehicle speed data and vehicle location data;
determining, at the server, whether the plurality of inputs match a plurality of criteria,
wherein the plurality of criteria include:
whether an input, received from the reserved vehicle, indicates that the reserved vehicle has moved within a predetermined period, wherein the predetermined period is configurable and stored in a memory of the server, and
whether the reserved vehicle has moved more than a predetermined distance within the predetermined period;
terminating, at the server, the ride clock if the plurality of inputs match the plurality of criteria;
calculating, at the server, a ride cost, wherein the ride cost comprises a duration of use of the reserved vehicle, minus the predetermined period;
communicating, by the server, with a network to charge the rider based on a duration of use or a travel distance;
transmitting, by the server, the ride cost to the application running on the user device; and
displaying, by the application, the ride cost on the user device.

2. The method of claim 1, wherein the plurality of inputs further comprise a user device location.

3. The method of claim 2, wherein the plurality of criteria further comprises whether a distance between a vehicle location and a user device location exceeds a predetermined threshold distance.

4. A method, comprising:
receiving, at a server via a wireless network and remote from a user device, an input from the user device or vehicle, which includes a location tracking system configured to be uniquely matched to a user, indicating a start of a ride of the matched vehicle;
beginning, by the server, a ride clock for the matched vehicle;
receiving, at the server, a plurality of inputs from sensors on the matched vehicle or the user device comprising vehicle speed and vehicle location;
determining, at the server, whether the plurality of inputs match a plurality of criteria;
terminating, at the server, the ride clock for the matched vehicle if the plurality of inputs match the plurality of criteria; and
communicating, by the server, with a network to charge the rider based on a duration of use or a travel distance.

5. The method of claim 4, further comprising:
receiving, at the server, a pause indication from the user device; and
pausing, by the server, the ride clock for the matched vehicle.

6. The method of claim 4, wherein the plurality of inputs further include whether the matched vehicle is moving.

7. The method of claim 4, wherein the plurality of criteria include whether an input, received from the matched vehicle, indicates that the vehicle has moved within a predetermined period.

8. The method of claim 7, wherein the plurality of criteria further comprises determining whether the matched vehicle has moved more than a predetermined distance within the predetermined period.

9. The method of claim 7, further comprising:
calculating, at the server, a ride cost, wherein the ride cost comprises a duration of use of the matched vehicle, minus the predetermined period;
transmitting, by the server, the ride cost to an application running on the user device; and
displaying, by the application, the ride cost on the user device.

10. The method of claim 8, further comprising:
calculating, at the server, a ride cost, wherein the ride cost comprises a duration of use of the matched vehicle, minus the predetermined period;
transmitting, by the server, the ride cost to an application running on the user device; and
displaying, by the application, the ride cost on the user device.

11. The method of claim 4, wherein the plurality of inputs further comprise a user device location.

12. The method of claim 11, wherein the plurality of criteria further comprises whether a distance between the matched vehicle location and the user device location exceeds a predetermined threshold distance.

13. A system comprising:
a vehicle comprising:
a location tracking system that is configured to be uniquely matched to a user;
a plurality of sensors including a location component; and
a communication link;
a user device comprising:
a location interface;
a network communication interface; and
an application having a user interface to the system; and
a server in communication with the matched vehicle and the application, wherein the server is remote from the matched vehicle and is configured to:
receive an input indicating a start of a ride of the matched vehicle from the location interface and network communication interface of the application;
initiate a ride clock for the matched vehicle;
receive a plurality of inputs comprising vehicle speed and vehicle location from the location component and communication link of the matched vehicle;
determine whether the plurality of inputs match a plurality of criteria;
terminate the ride clock for the matched vehicle if the plurality of inputs match the plurality of criteria; and
communicate with a network to charge the rider based on a duration of use or a travel distance.

14. The system of claim 13, wherein the server is further configured to:
   receive a pause indication from the user device; and
   pause the ride clock for the matched vehicle.

15. The system of claim 13, wherein the plurality of inputs further include whether the matched vehicle is moving.

16. The system of claim 13, wherein the plurality of criteria include whether an input, received from the matched vehicle, indicates that the matched vehicle has moved within a predetermined period.

17. The system of claim 16, wherein the plurality of criteria further comprises determining whether the matched vehicle has moved more than a predetermined distance within the predetermined period.

18. The system of claim 16, wherein the server is further configured to:
   calculate a ride cost,
      wherein the ride cost comprises a duration of use of the matched vehicle, minus the predetermined period;
   transmit the ride cost to the application running on the user device; and
   cause the application to display the ride cost on the user device.

19. The system of claim 13, wherein the plurality of inputs further comprise a user device location.

20. The system of claim 19, wherein the plurality of criteria further comprises whether a distance between the matched vehicle location and the user device location exceeds a predetermined threshold distance.

* * * * *